United States Patent [19]

Lech, Jr. et al.

[11] Patent Number: 4,553,655
[45] Date of Patent: Nov. 19, 1985

[54] TWO-STAGE CLUTCH DAMPER ASSEMBLY

[75] Inventors: Thaddeus Lech, Jr., Farmington Hills; Paul L. Schmitz, Warren, both of Mich.

[73] Assignee: Borg-Warner Corporation, Chicago, Ill.

[21] Appl. No.: 556,475

[22] Filed: Nov. 30, 1983

[51] Int. Cl.$^4$ ............................................. F16D 3/14
[52] U.S. Cl. ............................ 192/106.2; 192/70.17; 192/106.1
[58] Field of Search ............... 192/106.2, 106.1, 70.17

[56] References Cited

U.S. PATENT DOCUMENTS

| 1,807,798 | 6/1931 | Short. | |
|---|---|---|---|
| 2,745,268 | 5/1956 | Reed. | |
| 3,252,300 | 5/1966 | Hofmann. | |
| 3,811,545 | 5/1974 | Sato et al. | 192/106.1 |
| 4,043,437 | 8/1977 | Taylor | 192/13 R |
| 4,046,237 | 9/1977 | Root et al. | 192/13 R |
| 4,068,749 | 1/1978 | Antrim | 192/106.1 |
| 4,088,395 | 5/1978 | Brown | 192/106.2 |
| 4,094,212 | 6/1978 | Brown | 192/106.2 |
| 4,101,015 | 7/1978 | Radke | 192/106.2 |
| 4,185,728 | 1/1980 | Gatewood | 192/106.2 |
| 4,222,475 | 9/1980 | Fenart | 192/106.2 |
| 4,241,818 | 12/1980 | Miller | 192/55 |
| 4,354,586 | 10/1982 | Stanley | 192/106.2 |
| 4,401,201 | 8/1983 | Gatewood | 192/106.2 |
| 4,418,812 | 12/1983 | Lech, Jr. | 192/106.2 |
| 4,446,955 | 5/1984 | Lech, Jr. | 192/106.1 |
| 4,485,908 | 12/1984 | Gatewood | 192/70.17 |

Primary Examiner—Henry C. Yuen
Attorney, Agent, or Firm—James A. Geppert

[57] ABSTRACT

A two-stage clutch damper assembly for use in an automotive vehicle adapted to dissipate the irregular impulses of the vehicle engine when the transmission is in neutral, the clutch is engaged and the engine is at idle rpm. The assembly includes a clutch plate, a spring retainer plate secured to the clutch plate, and a hub in operative engagement with the transmission input shaft and having an integral hub flange between the plates with spring windows opened to allow an additional rotational travel of the clutch and spring retainer plates relative to the hub. A cam and detent arrangement between the clutch plate and hub includes detent recesses formed in either a cam, the hub flange or the clutch plate, and a plurality of ramps formed in a retainer secured to the clutch plate, integral with the clutch plate or as spring-biased balls in the hub. A further arrangement includes a cam and ramp having mating helical gear teeth, and axial compression springs acting to yieldably bias the cam and hub apart.

14 Claims, 12 Drawing Figures

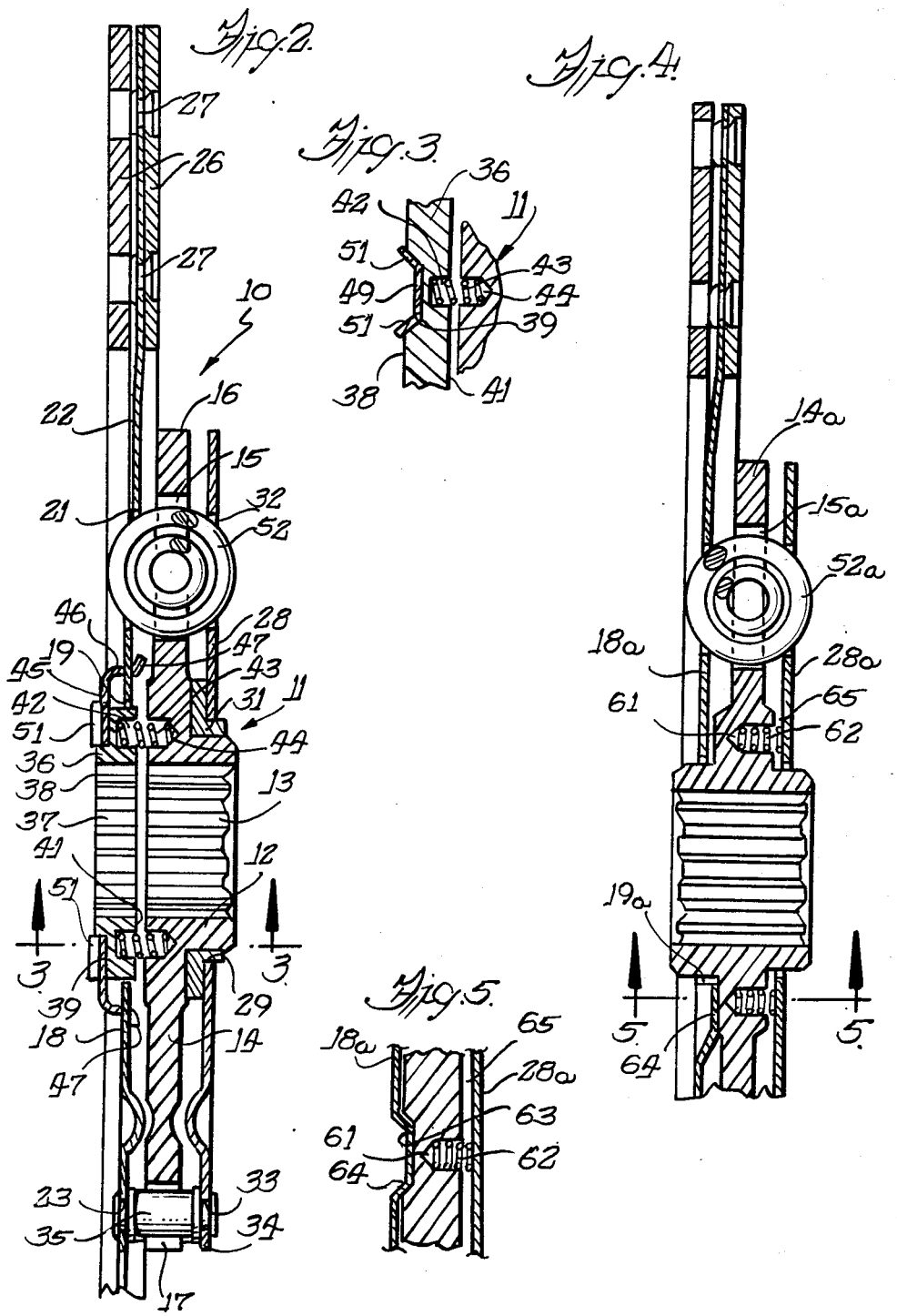

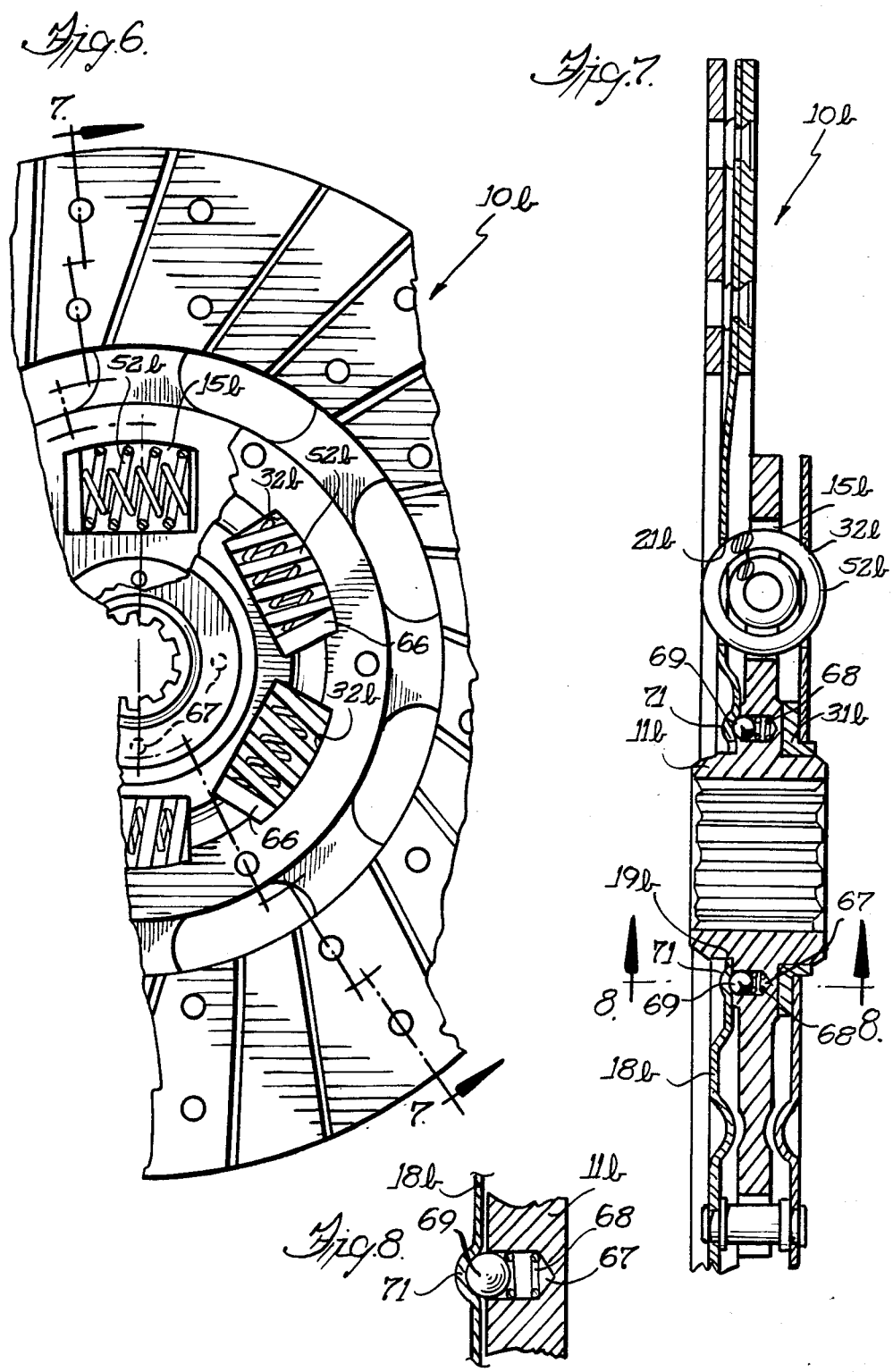

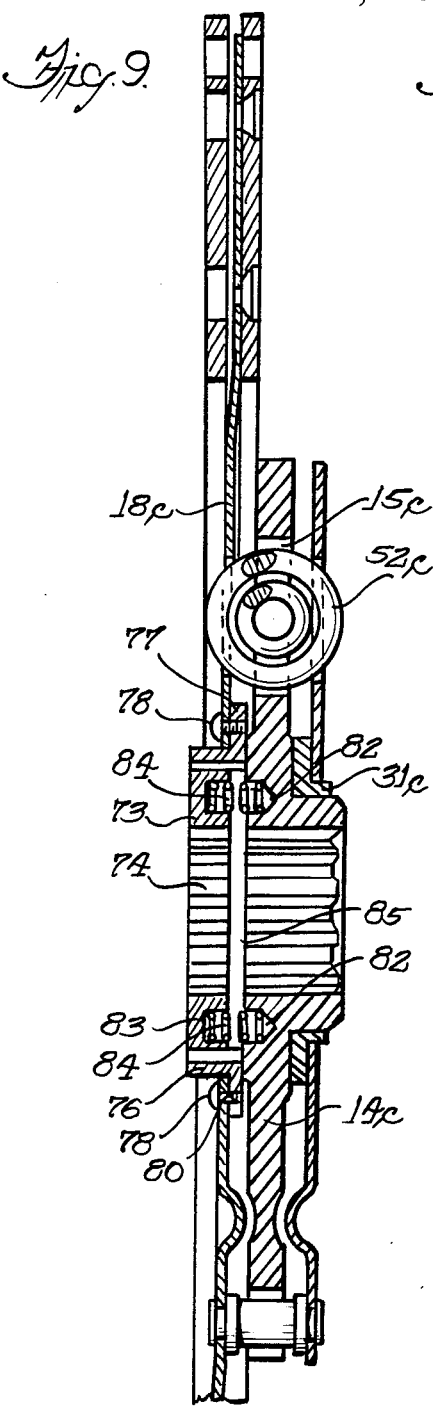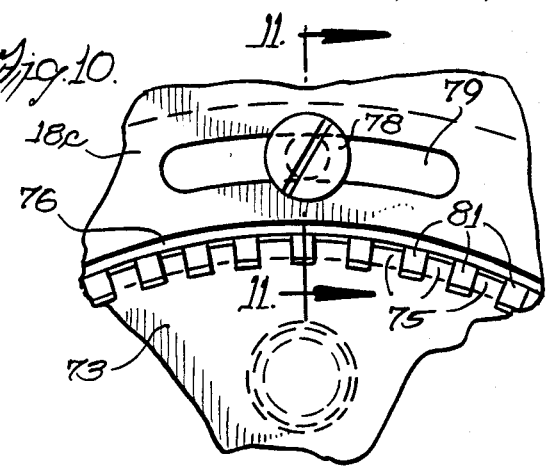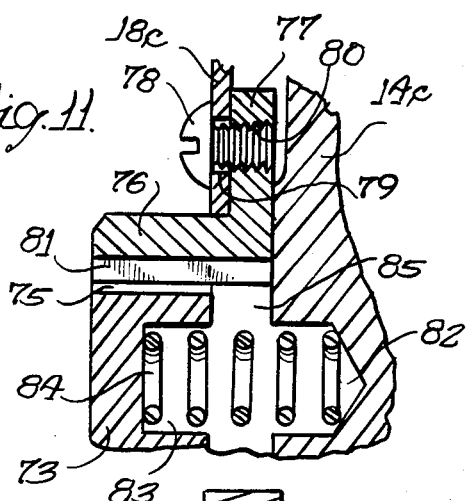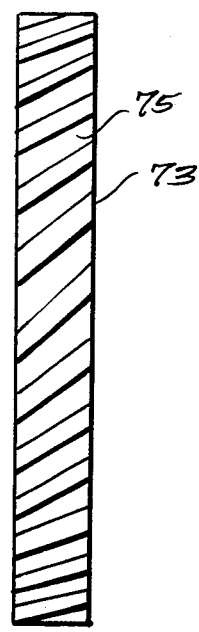

TWO-STAGE CLUTCH DAMPER ASSEMBLY

BACKGROUND OF THE INVENTION

In a conventional friction clutch for the drive train of an automotive vehicle, the engine has power and inertia impulses which drive the engaged clutch with an irregular series of thrusts when the transmission is in neutral and the engine is at idle rpm. These impulses will be transmitted through the input shaft to the transmission gears which become excited, resulting in oscillation through their backlash space to produce objectionable rattle. In the copending application Ser. No. 212,925, now U.S. Pat. No. 4,446,955, a clutch driven plate assembly is disclosed utilizing a helical connection between an inner hub and an outer hub to allow relative axial movement between the hubs to dissipate the engine impulses. The present invention relates to another approach to this problem to simplify construction of the clutch assembly.

SUMMARY OF THE INVENTION

The present invention comprehends the provision of a two-stage clutch damper assembly having a novel hub and cam arrangement to dissipate engine impulses which had previously resulted in objectionable transmission gear rattle with the clutch engaged, the transmission in neutral and the engine at idle rpm. The hub arrangement includes a hub barrel in operative engagement with the transmission input shaft and an integral radial flange with enlarged spring windows relative to the spring windows formed in the clutch and spring retainer plates; the clutch plate carrying the clutch friction facings at its periphery. A camming arrangement is provided between the clutch plate and hub to translate rotary movement of the clutch plate into axial reciprocatory movement of a member splined onto the transmission input shaft.

The present invention also comprehends the provision of a two-stage clutch damper assembly having a novel camming arrangement including a hub having an integral flange with enlarged spring windows for both the drive and coast directions relative to the windows in the clutch and spring retainer plates, a cam member in splined engagement with the transmission input shaft and a retainer secured to the clutch plate. The cam member and retainer have complementary interengaging detents and ramps so that relative rotation results in axial movement of the cam during idling. Compression springs are interposed between the cam member and the hub to yieldably resist movement of the cam towards the hub, with the springs being 90° out of plane with the normal damper springs.

The present invention further comprehends the provision of a two-stage clutch damper assembly having a camming arrangement between the clutch plate and hub. The camming arrangement utilizes either ramps integral with the clutch plate with detents formed in the hub or spring-biased balls in recesses in the hub cooperating with detents formed in the clutch plate.

A two-stage clutch damper assembly is also comprehended including a generally cylindrical cam positioned within a ramp secured to the clutch plate. The cam is splined on the input shaft and has external helical gear teeth which engage with mating internal helical gear teeth on the ramp, and compression springs are located between the cam and hub to bias the members apart.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view of the assembly taken on the irregular line 2—2 of FIG. 1.

FIG. 3 is an enlarged partial cross sectional view taken on the line 3—3 of FIG. 2 showing details of the cam and detent arrangement for the assembly.

FIG. 4 is a partial cross sectional view similar to FIG. 2, but showing a second embodiment of cam and detent arrangement for the clutch assembly.

FIG. 5 is an enlarged partial cross sectional view taken on the line 5—5 of FIG. 4 showing details of the cam and detent arrangement.

FIG. 6 is a partial rear elevational view similar to FIG. 1, but showing a third embodiment of cam and detent arrangement.

FIG. 7 is a partial cross sectional view taken on the irregular line 7—7 of FIG. 6.

FIG. 8 is an enlarged partial cross sectional view taken on the line 8—8 of FIG. 7.

FIG. 9 is a partial cross sectional view similar to FIG. 2, but showing a fourth embodiment of camming arrangement.

FIG. 10 is an enlarged partial front elevational view showing details of the camming arrangement of FIG. 9.

FIG. 11 is an enlarged partial cross sectional view taken on the line 11—11 of FIG. 10.

FIG. 12 is an enlarged elevational view of the cam member in the arrangement of FIG. 9.

DESCRIPTION OF THE PREFERRED EMBODIMENTS

Figure 1:
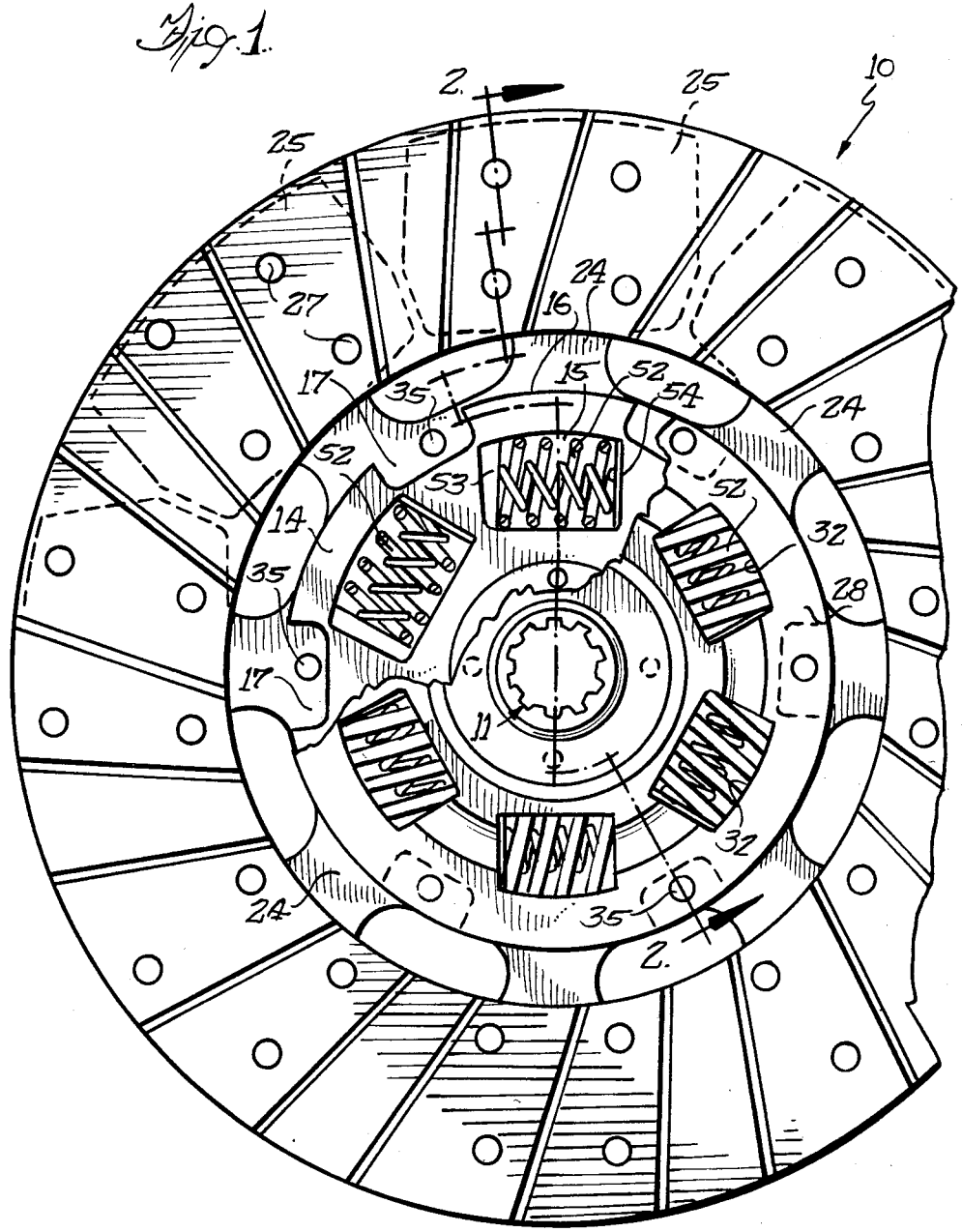
FIG. 1 is a rear elevational view of a two-stage clutch damper assembly partially broken away embodying the present invention.

Referring more particularly to the disclosure in the drawings wherein are shown illustrative embodiments of the present invention, FIGS. 1 through 3 disclose a two-stage clutch damper assembly 10 including a hub member 11, a clutch plate 18 carrying friction facings 26 mounted on the periphery thereof and adapted to be positioned between friction surfaces of a flywheel and a pressure plate (not shown) for the vehicle clutch, and a spring retainer plate 28. The hub member 11 includes a barrel 12 with a splined central opening 13 receiving the splined end of a transmission input shaft (not shown) and an integral radial flange 14 having a plurality of circumferentially equally spaced arcuate spring windows 15 and terminating in a periphery 16 with a plurality of circumferentially equally spaced elongated notches 17.

The clutch driven plate 18 has a central opening 19, a plurality of circumferentially equally spaced spring windows 21, an intermediate portion 22 containing a plurality of openings 23 arranged in a circle, and a plurality of flexible spokes 24 which are enlarged to provide the cushioning plates 25 carrying the opposed friction facings 26 for the clutch secured thereto by rivets 27.

The spring retainer plate 28 has a central opening 29 to receive a piloting bushing 31 journalled on the hub barrel 12, a plurality of circumferentially equally spaced arcuate spring windows 32 axially aligned with the windows 15 and 21 of the hub and clutch plate, respectively, and a plurality of openings 33 in the periphery 34 thereof axially aligned with openings 23 to receive spacer rivets 35 securing the clutch plate 18 and spring retainer plate 28 together; the rivets extending through the peripheral notches 17 in the hub flange. The piloting bushing 31 is utilized so that the hub is piloted concentric in the assembly. The bushing or spacer may be formed of a suitable plastic material and, although not shown, one or more friction washers may be located between the hub flange and bushing if additional frictional lag force is desired.

A circular cam member 36 is positioned concentrically within the central opening 19 of the clutch driven plate 18 and has a central splined opening 37 receiving the splined end of the transmission input shaft; the splines of the hub and cam member being axially aligned. The front face 38 of the cam member is provided with a plurality of circumferentially spaced detents or recesses 39 and the rear surface 41 is provided with a plurality of axially extending spring pockets 42 receiving compression springs 43.

Also, spring pockets 44 are formed in the hub member 11 facing and axially aligned with the pockets 42 to receive the opposite ends of compression springs 43. These springs serve the dual function of normally biasing the hub member and cam member apart and of aligning the splines in the central openings 13 and 37 of the hub barrel 12 and cam member 36, respectively. A generally circular retainer 45 has an outer peripheral rearwardly extending flange 46 terminating in spaced tabs 47 which are received in suitable slots in the clutch plate 18 and are bent over to secure the plate and retainer together. Around its inner periphery the retainer is provided with radially inwardly extending tabs 49 having inclined ramps 51 complementarily received in the detents 39 (FIG. 3).

One or more concentric damper springs 52 are located in each aligned set of spring windows 21, 15 and 32 in the plates and hub flange, with the plate windows 21 and 32 having smaller radial dimensions than the openings 15 to retain the springs in operative position. As seen in FIG. 1, the spring windows 15 in the hub flange are enlarged relative to the clutch and spring retainer plate windows in the drive direction at 53 and by a smaller amount in the coast direction at 54. The function of the enlarged windows will become more apparent when considering operation of the assembly. Also, the springs 43 are 90° out of plane with the normal damper springs 52 to break up harmonic influence and resonance by changing the plane of motion.

In the normal position of the hub assembly with the clutch disengaged, as seen in FIG. 2, the springs 43 urge the cam member 36 forwardly away from the hub member 11 with the ramps 51 being fully engaged with the detents 39 (FIG. 3). This clutch assembly operates in the same manner as a conventional assembly except for the action of the cam member 36 at idle rpm and in neutral transmission position. With the clutch engaged between the flywheel and pressure plate, the engine impulses during idle act to rotate the clutch plate 18, spring retainer plate 28 and damper springs 52 relative to the hub member 11 due to the enlarged portion 53 of the spring windows 15, with the retainer 45 being rotated by the clutch plate to cam the ramps 51 out of the detents 39 and urge the cam member 36 axially rearwardly on the transmission input shaft against the force of the compression springs 43 due to the interaction of the detents 39 and ramp surfaces 51. Movement continues until the damper springs strike the ends of the enlarged portion of the hub flange spring windows. The energy of the impulses is used to actuate the cam member in the above manner rather than transmit the undiminished impulses to the vehicle transmission to cause its gears to rattle. In the normal driving mode of the vehicle, the assembly operates in a conventional manner once the extra rotational travel is overcome.

In FIGS. 4 and 5, a second embodiment of detent means is provided for the two-stage operation. In which embodiment, the hub flange 14a has the spring windows 15a opened to allow extra rotational travel before it engages the damper springs 52a, and is formed with pockets 61 facing the spring retainer plate 28a to receive compression springs 62 engaging the plate 28a to bias the spring retainer plate and hub apart. The opposite face of the hub flange 14a contains recesses or detents 63 generally axially aligned with the spring pockets 61 and adapted to receive ramps 64 formed in the clutch plate 18a adjacent the central opening 19a. A gap 65 is provided allowing axial movement between the hub and spring retainer plate.

This assembly operates similar to a conventional automotive clutch driven plate assembly except that during the extra rotational travel when the damper spring 52a move in the enlarged portions of the hub flange windows 15a, the ramps 64 are caused to cam out of the detents 63 causing the hub spline to slide axially on the transmission input shaft thus closing the gap 65 and compressing the springs 62.

FIGS. 6 through 8 disclose a third embodiment of detent means for the two-stage damper operation. Again, the hub flange spring windows 15b are opened to allow extra rotational travel before they contact the damper springs 52b, and extra travel can also be provided by enlarging the spring windows 21b and 32b in the clutch and spring retainer plates as shown at 66 in FIG. 6. Similarly to FIG. 2, a pilot bushing 31b is utilized to locate the hub 11b centrally in the assembly 10b.

The hub contains circumferentially spaced pockets or holes 67 facing the clutch plate 18b receiving compression springs 68 and balls 69 which yieldably engage rounded detents 71 formed integral in the clutch plate 18b adjacent the central opening 19b. In this assembly during rotational travel when the springs 52b move in the opened windows, the detents 71 urges the balls 69 into the pockets 67 against the force of the springs 68.

A fourth embodiment is shown in FIGS. 9 through 12 with the opened spring windows 15c in the hub flange 14c allowing extra rotational travel of the plates relative to the hub before the springs 52c are compressed. The cam 73 is a generally cylindrical member having internal axial splines 74 receiving the splined end of the transmission input shaft and external helical gear teeth 75 arranged at approximately a 45° angle. A ramp member 76 has a radial flange 77 positioned between the clutch plate 18c and hub flange 14c and is adjustably secured to the clutch plate by screws 78 extending through arcuate slots 79 in the plate 18c and engaging in threaded openings 80 in the ramp flange 77. The ramp has internal helical gear teeth 81 complementary to and engaging the gear teeth 75. The hub and cam have axially aligned pockets 82 and 83, respectively, to receive compression springs 84 acting to yieldably urge the hub and cam apart and also indexing to align the splines of the two parts which engage the input shaft.

Again, the hub is piloted centrally in the assembly by the pilot bushing 31c.

This assembly operates similar to a conventional automotive clutch driven plate assembly except during the extra rotational travel when the helical gear arrangement between the cam and ramp drives the cam 73 rearward to slide on the transmission shaft, closing the gap 85, and compressing the springs 84.

We claim:

1. A two-stage clutch damper assembly for an automotive vehicle clutch driving a transmission input shaft, including a hub assembly having a barrel splined onto the input shaft and a radial flange having circumferentially spaced windows therein, a clutch plate carrying friction facings at the outer periphery thereof, a spring retainer plate secured to the clutch plate to sandwich the hub flange therebetween, said plates having circumferentially spaced windows therein axially aligned with said hub flange windows, and damper springs received in each set of windows, the improvement comprising a cam and detent arrangement between said clutch plate and hub, a plurality of axially extending compression springs between said hub and one of said cam, spring retainer plate or clutch plate, said hub flange windows extending circumferentially beyond said plate windows to allow limited rotation of the plates relative to said hub without compression of said damper springs, said cam and detent arrangement yieldably resisting said limited rotation.

2. A two-stage clutch damper assembly as set forth in claim 1, wherein rotation of said plates and damper springs causes relative rotation in said cam and detent arrangement and compression of said axial springs to provide yieldable resistance thereto.

3. A two-stage clutch damper assembly as set forth in claim 1, in which said cam and detent arrangement includes a generally cylindrical cam member splined onto said input shaft and having detent recesses formed in said forward face, and a retainer secured to said clutch plate and having circumferentially spaced ramps on its inner periphery conformably received in said detent recesses.

4. A two-stage clutch damper assembly for an automotive vehicle clutch driving a transmission input shaft, including a hub assembly having a barrel splined onto the input shaft and a radial flange having circumferentially spaced windows therein, a clutch plate carrying friction facings at the outer periphery thereof, a spring retainer plate secured to the clutch plate to sandwich the hub flange therebetween, said plates having circumferentially spaced windows therein axially aligned with said hub flange windows, and damper springs received in each set of windows, the improvement comprising a cam and detent arrangement between said clutch plate and hub including a generally cylindrical cam member splined onto said input shaft and having detent recesses formed in said forward face, and a retainer secured to said clutch plate and having circumferentially spaced ramps on its inner periphery conformably received in said detent recesses, said cam and hub having axially aligned facing pockets spaced circumferentially, and compression springs received in said pockets to bias the cam and hub apart, said hub flange windows extending circumferentially beyond said plate windows to allow limited rotation of the plates relative to said hub without compression of said damper springs, said cam and detent arrangement yieldably resisting said limited rotation.

5. A two-stage clutch damper assembly as set forth in claim 4, in which said ramps are formed as radially inwardly extending tabs on said retainer having inclined wings at the opposed edges received in complementary detent recesses.

6. A two-stage clutch damper assembly as set forth in claim 1, in which said cam and detent arrangement includes detent recesses formed in said hub flange, and ramps formed in the inner periphery of said clutch plate.

7. A two-stage clutch damper assembly as set forth in claim 6, in which said ramps include a flat bottom portion and inclined camming portions joining the bottom portion to the remainder of the clutch plate, said detent recesses being complementary to said ramps.

8. A two-stage clutch damper assembly as set forth in claim 6, wherein said hub flange has axially extending pockets facing said spring retainer plate, and compression springs received in said pockets with their free ends engaging said spring retainer plate to bias the hub towards the clutch plate.

9. A two-stage clutch damper assembly as set forth in claim 1, in which said cam and detent arrangement includes a plurality of detents formed adjacent the inner periphery of said clutch plate, and a plurality of camming balls in said hub flange engaging said detents.

10. A two-stage clutch damper assembly as set forth in claim 9, wherein said hub flange has a plurality of axial pockets therein facing said clutch plate and adapted to receive said balls, and compression springs in said pockets yieldably urging said balls into said detents.

11. A two-stage clutch damper assembly for an automotive vehicle clutch driving a transmission input shaft, including a hub assembly having a barrel splined onto the input shaft and a radial flange, a clutch plate carrying friction facings at the outer periphery thereof, a spring retainer plate secured to the clutch plate to sandwich said hub flange therebetween, said plates and hub flange having axially aligned sets of circumferentially spaced windows therein, and damper springs received in each set of windows, the improvement comprising a cam and ramp arrangement between said clutch plate and hub including a cylindrical cam splined onto said input shaft, axially aligned facing pockets formed in said cam and hub, and compression springs received in said pockets biasing said cam and hub apart, said hub flange windows extending circumferentially beyond said plate windows to allow limited rotation of said plates relative to said hub without compression of said damper springs, said cam and ramp arrangement yieldably resisting said limited rotation.

12. A two-stage clutch damper assembly as set forth in claim 11, wherein said cam has external helical gear teeth, and a generally cylindrical ramp secured to said clutch plate and having mating internal helical gear teeth.

13. A two-stage clutch damper assembly as set forth in claim 12, wherein said ramp has a radial flange located between said clutch plate and hub flange, and mounting screws extending through said clutch plate and threadingly engaging said ramp flange.

14. A two-stage clutch damper assembly as set forth in claim 13, wherein said clutch plate includes arcuate slots receiving said screws for radial adjustments between said clutch plate and ramp.

* * * * *